US006284714B1

(12) United States Patent
Bland et al.

(10) Patent No.: US 6,284,714 B1
(45) Date of Patent: Sep. 4, 2001

(54) PUMPABLE MULTIPLE PHASE COMPOSITIONS FOR CONTROLLED RELEASE APPLICATIONS DOWNHOLE

(75) Inventors: Ronald G. Bland; Lirio Quintero, both of Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/363,614

(22) Filed: Jul. 29, 1999

Related U.S. Application Data

(60) Provisional application No. 60/094,683, filed on Jul. 30, 1998.

(51) Int. Cl.$^7$ ............................... C09K 7/02; C09K 7/06
(52) U.S. Cl. .................. 507/100; 507/129; 507/131; 507/136; 507/140; 507/141; 507/145; 507/200; 507/925
(58) Field of Search .................. 516/54, 22; 507/136, 507/145, 140, 141, 129, 131, 100, 925, 200, 939, 269, 276, 277, 261, 239, 244

(56) References Cited

U.S. PATENT DOCUMENTS

| 3,681,240 |   | 8/1972  | Fast et al. .     |        |
|-----------|---|---------|------------------|--------|
| 4,012,329 |   | 3/1977  | Hayes et al. .   |        |
| 4,233,165 |   | 11/1980 | Salathiel et al. .|       |
| 5,189,012 |   | 2/1993  | Patel et al. .   |        |
| 5,902,227 | * | 5/1999  | Rivas            | 516/54 |
| 5,942,216 | * | 8/1999  | Herb et al.      | 516/54 |
| 5,985,177 | * | 11/1999 | Yoshida et al.   | 516/54 |

OTHER PUBLICATIONS

S. Matsumoto, "Interactions Between the Dispersed Globules of W/O/W Emulsions in Existence of Proteins and Saccharides," *10th International Symposium on Surfactants in Solution*, Caracas, Venezuela, Jun. 30, 1994, pp. 295–296.

C. Py, et al., "Investigations of Water/Oil/Water Multiple Emulsions for Cosmetic Applications," *10th International Symposium on Surfactants in Solution*, Caracas, Venezuela, Jun. 30, 1994, p. 297.

A. Cardenas, et al., "An Experimental Method to Collect Data on the Controlled Release Capacity of a Multiple Emulsion," *10th Int'l Symposium on Surfactants in Solution*, Caracas, Venzuela, Jun. 30, 1994, p. 299.

M. Briceno, et al., "Water Diffusion Induced by Osmotic Pressure Gradients in Multiple W/O/W Bitumen–in–Water Emulsions," *10th International Symposium on Surfactants in Solution*, Caracas, Venezuela, Jun. 30, 1994, p. 301.

N. Garti, et al., "Double Emulsions: Progress and Applications," *Current Opinion in Colloid & Interface Science*, vol. 3, No. 6, Dec., 1998, pp. 657–667.

* cited by examiner

*Primary Examiner*—Philip Tucker
(74) *Attorney, Agent, or Firm*—Madan, Mossman & Sriram, P.C.

(57) ABSTRACT

Pumpable multiple phase compositions for carrying agents and components downhole and controllably releasing them by breaking the suspensions are described. The multiple phase composition may have an external or third phase, which in turn has a first pumpable emulsion internally. The first pumpable emulsion has a second phase containing a first phase which bears the agent to be controllably released. The entire pumpable multiple phase composition may thus be an oil phase-in-aqueous phase-in-oil phase emulsion, or an aqueous phase-in-oil phase-in-aqueous phase emulsion. For example, a water-soluble shale stabilizer could be delivered downhole in an aqueous phase-in-oil phase-in-aqueous phase multiple phase emulsion by injecting the multiple phase composition into a water-based drilling fluid, and then the suspension broken by rotary bit nozzles under high shear stress to release the shale stabilizer at the drilling zone.

7 Claims, No Drawings

US 6,284,714 B1

PUMPABLE MULTIPLE PHASE COMPOSITIONS FOR CONTROLLED RELEASE APPLICATIONS DOWNHOLE

This application claims the benefit of U.S. provisional application no. 60/094,683, filed Jul. 30, 1998.

FIELD OF THE INVENTION

The controlled invention relates to methods and compositions for the controlled release of agents and components downhole in an oil recovery operation, and more particularly relates, in one embodiment, to emulsions for the controlled release of agents and components downhole.

BACKGROUND OF THE INVENTION

Drilling fluids used in the drilling of subterranean oil and gas wells as well as other drilling fluid applications and drilling procedures are known. In rotary drilling there are a variety of functions and characteristics that are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the claimed invention herein, the term "drilling fluid" also encompasses "drill-in fluids".

Drilling fluids are typically classified according to their base material. In water-based muds, solid particles are suspended in water or brine. Oil can be emulsified in the water. Nonetheless, the water is the continuous phase. Oil-based muds are the opposite. Solid particles are suspended in oil and water or brine is emulsified in the oil and therefore the oil is the continuous phase. Oil-based muds which are water-in-oil emulsions are also called invert emulsions.

It is apparent to those selecting or using a drilling fluid for oil and/or gas exploration that an essential component of a selected fluid is that it be properly balanced to achieve the necessary characteristics for the specific end application. Because the drilling fluids are called upon to do a number of tasks simultaneously, this desirable balance is not always easy to achieve.

It would be desirable if compositions and methods could be devised to aid and improve the ability of drilling fluids to accomplish these tasks by delivering agents and components downhole, which could be released controllably to accomplish one or more jobs.

SUMMARY OF THE INVENTION

Accordingly, it is an object of the present invention to provide a method and composition for delivering an agent downhole in a hydrocarbon recovery operation, particularly during a drilling and/or completion operation.

It is another object of the present invention to provide a method and composition for delivering an agent downhole where the agent is released at a controlled time and place.

In carrying out these and other objects of the invention, there is provided, in one form, a pumpable multiple phase composition, also called a multiple phase emulsion drilling or completion fluid, for carrying an agent having a first phase, a second phase, and a third phase. The first phase is suspended in the second phase to form a first pumpable emulsion, and next the first pumpable emulsion is dispersed in the third phase to form the final pumpable multiple phase composition. The pumpable multiple phase composition may be an oil phase-inaqueous phase-in-oil phase emulsion, or an aqueous phase-in-oil phase-in-aqueous phase emulsion. The agent is present in the first phase.

Additionally, there is provided in one form, a method for releasing an agent downhole beginning by forming a first pumpable emulsion for carrying an agent. The first pumpable emulsion has a first phase containing the agent, and a second phase. The first phase is suspended in the second phase to form a first pumpable emulsion. The first pumpable emulsion may be an oil phase-in-aqueous phase emulsion, or an aqueous phase-in-oil phase emulsion, where the agent is present in the first phase or is the first phase. Next, the first pumpable emulsion is injected into a fluid which may be either a drilling fluid or a completion fluid, such that the external phase of the drilling or completion fluid is immiscible with the second phase of the first pumpable emulsion thereby forming a pumpable multiple phase composition (multiple emulsion). Finally, the pumpable multiple phase composition is broken downhole to release the agent. The pumpable multiple phase composition may be broken by shear, for example, by pumping through drill bit nozzles.

DETAILED DESCRIPTION OF THE DRAWINGS

Pumpable multiple phase compositions (emulsions) are anticipated as being useful to organize a liquid phase to isolate one miscible phase from another. An oil-in-water emulsion could be used in an invert emulsion, hydrocarbon-based or ester-based or other water immiscible, non-aqueous-based system (forming an oil-in-water-in-oil system), while a water-in-oil emulsion could be used in an aqueous system (forming a water-in-oil-in-water system). In short, the multiple emulsion compositions of this invention and methods for their use may be applied to any two immiscible phases that form stable emulsions. The phases need not be "oil" and "water", although such phases are likely to be the most common implementation. One non-limiting example is the combination of a water soluble, relatively high molecular weight glycol that forms an emulsion with brine.

One important application of this kind of organization would be the controlled release of the internal phase contents, such as an agent within the innermost (first) phase. A non-limiting example of such an application would be the emulsion of, for instance, a polyglycol, potassium salt, aluminum salt, calcium salt, a silicate salt, chelate or other shale stabilizer, or an aqueous solution thereof, as a first, internal phase in a hydrocarbon or hydrophobic carrier (second phase) optionally containing an emulsifier and/or stabilizer, and then adding the emulsion to a water-based drilling fluid. The polyglycol, potassium salt, aluminum salt, etc. or other shale stabilizer, alone if liquid, or in solution, e.g., is isolated from the water in the external phase of a water-based drilling fluid. Dilution is prevented, suppressed, or delayed until the emulsion is broken intentionally. A likely area for breakage of the emulsion is the high shear environment of and below the drilling bit, where the shale stabilizer is released to the borehole and cuttings in concentrated form on a localized basis. While the invention does not contemplate, as a preferred embodiment, making the multiple emulsion so stable that it is not broken in a drilling fluid or completion fluid application, such stable multiple emulsions are anticipated and may find utility.

Of course, emulsifiers, viscosifiers, or other structural stabilizers may also be added to increase the mechanical stability of the first pumpable emulsion in some cases to delay release of the contents (agent).

In more detail, the agent to be delivered as the contents of the internal phase or the first phase, may be any conventional agent, including, but not necessarily limited to, a shale stabilizer, as noted above, a filtration control additive, viscosifier, suspending agent, dispersant, thinner, an anti-balling additive, a lubricant (particularly in the oil-in-water-in-oil multiple phase compositions), a wetting agent, a seepage control additive, a lost circulation additive, drilling enhancer, penetration rate enhancer, corrosion inhibitor, acid, base, buffer, scavenger, gelling agent, cross-linker, catalyst, and the like, and mixtures thereof. Specific useful shale stabilizers include, but are not necessarily limited to, polyglycols, potassium salts, aluminum salts, calcium salts, silicate salts, chelates, amines, alkanolamines, alkanolamides, amphoteric compounds, alone if liquid or in aqueous solutions, and mixtures thereof. Some other specific agents include, but are not limited to amines (failing quartz bonds in certain sands, corrosion inhibitors in clay based systems, shale stabilizers) and metal halides, e.g. aluminum and thorium halides. The term "acids" in this context includes organic acids and inorganic acids. Such acids can be used to treat cement contamination. If appropriate or desirable, the agent may be in aqueous or hydrocarbon solution.

This first or internal phase should match that of the ultimate fluid in which the first pumpable emulsion is to be injected or added. That is, if the first pumpable emulsion is to be injected into an aqueous fluid, the first, internal phase should be aqueous; if the fluid is hydrophobic, the first, internal phase should be hydrophobic.

Of course, the second phase, which together with the first or internal phase forms the first pumpable emulsion, should be of the opposite type. It may be necessary or desirable to add emulsifiers, viscosifiers, stabilizers, and mixtures thereof as structural stabilizers to increase the mechanical stability of this first emulsion to aid in delaying release or breaking. In the context of this invention, emulsifiers should be understood to include, but are not limited to, surfactants and the like, and viscosifiers are understood to include, but are not limited to, gelling agents and the like. The emulsifiers and viscosifiers may be in liquid or solid (e.g. powder) form. Suitable emulsifiers include, but are not necessarily limited to, sorbitan fatty acid esters including sorbitan monooleate and sorbitan trioleate, glycerol fatty acid esters including mono- and/or dioleates, polyglycerol fatty acid esters, polyglycols, alkanolamines and alkanolamides such as ethoxylated amines, ethoxylated amides, ethoxylated alkanolamides, including non-ethoxylated ethanolamides and diethanolamides, and the like. Viscosifiers and gelling agents include, but are not necessarily limited to, polymers of ethylene, propylene, butylene, butadiene, styrene, vinyl-toluene and various copolymers and terpolymers thereof, organophilic clays, aluminum soaps and alkoxides and other aluminum salts, alkaline earth soaps, lithium soaps, fumed silica and alumina and the like and mixtures thereof. Other suitable stabilizers include, but are not necessarily limited to, cholesterol and long chain oil soluble waxy alcohols, and the like. These structural stabilizers would usually be added directly to the second phase although they may be added to the third phase, if that is more convenient. In one non-limiting embodiment of the invention, the proportion of structural stabilizer based on the second phase ranges from about 0.1 to about 90 vol. %, preferably from about 1 to about 50 vol. %.

However, the pumpable multiple phase compositions of the invention (emulsions) are designed to be broken in a preferred embodiment. Indeed, they are desirably and rather controllably broken within a certain area of the borehole at a designated and relatively controlled time.

The preparation of the first pumpable emulsion would typically involve the mixing of the first phase with the second phase, where any emulsifier or structural stabilizer is preferably present in the second phase. The speed of stirring or mixing of the two phases would depend upon the size of the emulsified internal phase droplets desired, and the particular system used. It is expected that the size of the first phase droplets would range from about 0.01 to about 1000 microns or less, preferably from about 1 to about 100 microns or less, as non-limiting examples. In one embodiment of the invention, the first phase droplets would be as large as is practical. The proportion of first, internal phase to the overall first pumpable composition may range from about 90 to about 5 vol. % or less, preferably from about 60 to about 40 vol. % or less, and most preferably, 50 vol. % or less, as non-limiting examples. A lower threshold of 5 vol. % may be appropriate in some embodiments of the invention.

The formation of the first pumpable emulsion could be accomplished within an injection pump itself. This technique would be similar to in-line mixing the first, internal phase "on the fly" with the second phase forming the first emulsion before it exits into the third phase finally forming the multiple emulsion in the mud system.

The first pumpable emulsion is then, in turn, suspended in the drilling and/or completion fluid which is the third phase. This third phase is generally to be miscible with the first phase and may contain an emulsifier to help disperse the first pumpable emulsion into suitable sized droplets. Conventional drilling and/or completion fluids may be used as the third phase. If the third phase is oil-based or a hydrocarbon, in a preferred embodiment, the hydrocarbon is a synthetic material, and, for instance, may include, but is not necessarily limited to, esters, iso-olefins, alpha-olefins, polyolefins, poly-alpha-olefins, paraffins, Fischer-Tropsch reaction products, and the like. The oil phase may be a mixture or blend of petroleum distillates and synthetic hydrocarbons. Suitable petroleum distillates include, but are not limited to, diesel oil, kerosene, mineral oils, food grade mineral oils, paraffinic oils, cycloparaffinic oils, aromatic oils, or n-paraffins, isoparaffins and similar hydrocarbons. Crude oil could be used in some cases. In the case where the second phase is an oil-based phase, it is anticipated that any of these hydrocarbons may be used.

In the case where the multiple phase composition is water-in-oil-in-water multiple emulsion, the aqueous phase may be brine. Careful adjustment of the internal phase salinity of brine multiple emulsions may be required (osmotic pressure gradient adjustment). Too much salt or too low an activity in a first aqueous phase may make the droplets unstable. However, this mechanism may be intentionally used to cause failure or rupture of the first pumpable emulsion droplets or capsules downhole. For example, the droplets could be designed to grow on the journey downhole and break at or near the desired zone.

It is expected that the size of the droplets of the first pumpable emulsion (first phase in second phase) in the third phase would range from about 10,000 to about 1 micron or less, preferably from about 5 to about 1,000 microns or less, as non-limiting examples. In one embodiment of the invention, the pumpable emulsion droplets would be as large as possible. The larger the first phase droplets in the first emulsion droplets, all things being equal, the easier it would be to break the multiple phase composition to release the agent from the first emulsion.

The proportion of the first pumpable emulsion to drilling and/or completion fluid (third phase) may range from about 0.5 to about 90 vol. %, alternatively from about 0.5 to about 40 vol. %, preferably from about 1 to about 10 vol. %, in another embodiment from about 1 to about 5 vol. %, and most preferably from about 2 to about 6 vol. %, as non-limiting examples, to make the overall pumpable multiple phase composition.

Conventional drilling and/or completion fluid additives may, of course, be employed, including, but not necessarily limited to, wetting agents, viscosifiers, suspending agents, weighting agents, shale stabilizers, filtration control additives, anti-balling additives, lubricants, seepage control additives, lost circulation additives, corrosion inhibitors, alkalinity control additives, thinners, dispersants, and the like. Indeed, the agents to be delivered by the multiple emulsion compositions and methods herein may also be present in the third phase.

The method of this invention may find particular usefulness in increasing the local concentration of an agent downhole after rupture of the first pumpable emulsion droplets while keeping the overall concentration of the agent in the drilling mud (including the entire multiple phase composition) low. For example, styrene-butadiene rubber (SBR), useful as a viscosifier and/or filtration control additive, could be the agent in the first phase of the first pumpable emulsion and be in relatively low concentrations overall. However, once the first pumpable emulsion droplets are broken or failed, the local concentration of SBR at the droplet failure zone would be relatively increased.

Using the pumpable emulsion composition of the invention is straightforward and requires no special equipment. The first pumpable emulsion is injected into a fluid that is pumped downhole. The fluid may be a drilling fluid, drill-in fluid, a completion fluid, or the like. In a preferred embodiment of the invention, the fluid is a drilling fluid or drill-in fluid A number of mechanisms could be used to break the pumpable multiple phase composition at a particular time, including, but not limited to, input of energy, including but not limited to, an increase in temperature, increase in pressure, increase in shear stress or shear rate, mechanical action (such as a rotating drill bit or drill string), change in pH, change in electrical potential, solvent thinning, presence of a chemical agent, presence of a catalyst, change in magnetic flux, and the like. A nor-limiting, but preferred method is breaking the multiple phase composition by subjecting it to a high shear environment, in particular the fluid stream exiting a nozzle impinging on the borehole such as below a bit or opposite a reamer or hole opener. In a preferred method of the invention, the multiple phase emulsion is broken within a required period of time, and within a required physical volume. In one embodiment, if the agent being delivered was a shale stabilizer, the shale stabilizer could be delivered essentially instantaneously to the borehole and cuttings in a concentrated form on a localized basis.

It will also be understood that more than one agent may be delivered downhole, and that the two or more agents may interact or react with each other to provide a beneficial effect. For example, crosslinkers would be transported in first water-in-oil emulsion in the same aqueous third phase as a second water-in-oil emulsion containing the agent to be cross-linked. Alternatively, two separate internal phases which react on contact could be delivered in the same first emulsion added to the third phase such as an aqueous cross-linker and aqueous polymer solution could both be transported in the same first emulsion and added to a water-based mud. Indeed, one reactant could be present in the third phase and another reactant could be present in the first phase and the reaction could occur when the boundary of the second phase (first pumpable emulsion) is broken.

The agent may also be a polymer serving any of the stated functions, or a monomer to be polymerized or in the course of being polymerized to such a polymer.

Further, the multiple phase compositions of this invention are not limited to utility in downhole applications, but could be used to deliver and transport agents along a pipeline or other conduit, such as agents to prevent blockages (e.g. asphaltenes, hydrates, etc.) in a subsea pipeline or the like, or other agents. Any of the agents previously mentioned may be used in this way, and suitable agents may additionally include, but are not limited to, hydrate inhibitors, asphaltene inhibitors, scale inhibitors, etc.

The invention will be illustrated further with respect to the following Examples which are not intended to limit the invention but rather simply to additionally illuminate it.

EXAMPLES 1–7

The following ISOTEQ solutions were mixed:

80/20 I/SMO—2 g sorbitan monooleate (SMO) was mixed with 8 g ISOTEQ® isomerized olefin marketed by Baker Hughes INTEQ.

80/20 I/PGO—2 g Limulse polyglyercol oleate (PGO) was mixed with 8 g ISOTEQ.

80/20 I/295/S—2 g Alkamide DIN-295/S (Rhone Poulenc's linoleamide DEA) was mixed with 8 g ISOTEQ All of the above were clear solutions.

The following mixtures of AQUACOL® polyglycol solution marketed by Baker Hughes INTEQ were prepared:

50% Aq—5 g AQUACOL with 5 g D.I. water

30% Aq—3 g AQUACOL with 7 g D.I. water

20% Aq—2 g AQUACOL with 8 g D.I. water

The AQUACOL solutions were then emulsified into the indicated ISOTEQ solution at 50/50 wt/wt.

For the 80/20 I/295/S solutions, the following were obtained:

Ex. 1 using 50% Aq: The emulsion was unstable, i.e. it separated instantly.

Ex. 2 using 30% Aq: The emulsion was unstable, i.e. it separated almost immediately.

Ex. 3 using 20% Aq: The emulsion was relatively stable, i.e. it formed an emulsion which seemed stable at least short term.

The 20% AQUACOL aqueous solutions were then emulsified into the ISOTEQ solutions at 50/50 wt/wt using a high speed mixer (TISSUE-TEARER by BIOSPEC Products, Inc.). Then 0.5 g of this emulsion was mixed into 9.5 g of D.I. water to form multiple emulsions. 80/20 I/SMO (Ex. 4), 80/20 I/PGO (Ex. 5) and 80/20 I/295/S (Ex. 6) all seemed to work fairly well forming multiple emulsions viewed in a microscope.

The 20% AQUACOL aqueous solutions were again emulsified into the ISOTEQ solutions at 50/50 weight/weight using the TISSUE-TEARER as above and 0.5 g of the resulting emulsions were mixed with 9.5 g of 12% KCl to form multiple emulsions, but only the composition with 80/20 I/PGO actually formed a multiple emulsion (Ex. 7), the 80/20 I/SMO and 80/20 I/295/S seemed to form only simple oil in water emulsions.

After 12 days, the multiple emulsions from 50,/50 (wt/wt) 20% Aq in ISOTEQ solutions were examined, with the following observations:

Ex. 5: 80/20 I/PGO in D.I. water—Still had ISOTEQ phase droplets with outside diameters of 2.3$\mu$ to 97$\mu$, but no internal aqueous phase droplets.

Ex. 7: 80/20 I/PGO in 12% KCl—Still had ISOTEQ phase droplets with outside diameters 37$\mu$, but no internal aqueous phase droplets.

Ex. 6: 80/20 I/295/S in D.I. water—Still had external phase droplets with outside diameters 83$\mu$ diameter, and contained internal aqueous phase droplets.

Ex. 4: 80/20 I/SMO in D.I. water—similar observations to those of Example 7.

Only 80/20I/295/S of Example 6 actually retained multiple emulsion character with both internal aqueous phase droplets -contained within external ISOTEQ phase droplets.

The Examples also show:
- the importance of matching the emulsifier to the salinity of the (in this case) external phase;
- the effect of different emulsifiers on multiple emulsion stability;
- how internal phase composition can affect emulsion stability; and
- how salinity can regulate multiple emulsion stability.

EXAMPLE 8

It is expected that the invention would be implemented as follows. A 20 vol. % polyglycol solution in tap water would be prepared using a polyglycol known for its shale stabilizing properties, such as AQUACOL® polyglycol solution marketed by Baker Hughes INTEQ. This solution would be Phase 1. A second phase, Phase 2, would be prepared by adding 20 vol. % of a mixture of glycerol monooleate and glycerol dioleate (equal parts) to 80 vol. % of a $C_{14}$–$C_{18}$ isomerized olefin such as ISOTEQ® olefin marketed by Baker Hughes INTEQ. Phase 1 would be gently mixed into Phase 2 at a 50/50 vol/vol ratio to form a crude, pumpable, emulsion. This emulsion would be added to a water-based drilling fluid (Phase 3) at a concentration of 5 vol. % forming a multiple emulsion drilling fluid. The multiple emulsion drilling fluid would be formed "on the fly" while drilling a water sensitive shale prone to balling bits and stabilizers by addition of the original, pumpable emulsion to the suction pit of the water-based drilling fluid prior to pumping the fluid downhole. The concentrated AQUACOL in the Phase 1 droplets would be isolated from the miscible Phase 3 by the hydrophobic Phase 2 film and would be transported to the bottom of the hole during pumping. The multiple emulsion droplets would be designed to survive the high shear environment of the drill pipe, but not the extreme high shear environment below the bit nozzles. The extreme high shear environment at the borehole wall surface under the bit nozzles as the nozzles blast fluid at the borehole surface would induce rupture of the hydrophobic film separating Phase 1 and Phase 3 to expose the borehole to Phase 1. The localized concentration of the AQUACOL shale stabilizer near the exposed borehole wall would be greater than the gross concentration of the AQUACOL (20%×50%×5%= 0.5%) which would increase the efficiency of the AQUACOL over that achievable by simply adding the AQUACOL to the drilling fluid at a uniform 0.5 vol. %.

In the foregoing specification, the invention has been described with reference to specific embodiments thereof, and has been suggested as effective in providing pumpable, multiple phase compositions which can effectively carry agents and components downhole for controlled release in space and time. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of phases, agents, structural stabilizers, etc. and proportions thereof falling within the claimed parameters, but not specifically identified or tried in a particular composition to improve the delivery of agents and components herein, are anticipated to be within the scope of this invention.

We claim:

1. A pumpable multiple phase composition for carrying an agent comprising:
    a first phase;
    a second phase; and
    a third phase;
    where the first phase is suspended in the second phase to form a first pumpable emulsion, and the first pumpable emulsion is dispersed in the third phase to form the pumpable multiple phase composition, which is selected from the group consisting of
        an oil phase-in-aqueous phase-in-oil phase composition, and
        an aqueous phase-in-oil phase-in-aqueous phase composition;
    where the agent is present in the first phase;
    where the third phase is selected from the group consisting of a drilling mud, a drill-in fluid, and a completion fluid, and where the pumpable multiple phase composition further comprises a weighting agent.

2. The pumpable multiple phase composition of claim 1 in which the agent is selected from the group consisting of a shale stabilizer, a filtration control additive, viscosifier, suspending agent, dispersant, thinner, an anti-balling additive, a lubricant, a wetting agent, a seepage control additive, a lost circulation additive, drilling enhancer, penetration rate enhancer, corrosion inhibitors, scavengers, catalysts, acids, bases, gelling agents, buffers, cross-linkers, and mixtures thereof.

3. The pumpable multiple phase composition of claim 2 in which the agent is a shale stabilizer selected from the group consisting of a polyglycol, potassium salt, an aluminum salt, a calcium salt, a silicate salt, a chelate, an amine, an alkanolamine, an alkanolamide, an amphoteric compound, and mixtures thereof, alone if liquid or in solution.

4. The pumpable multiple phase composition of claim 1 further comprising a structural stabilizer.

5. The pumpable multiple phase composition of claim 4 where the structural stabilizer is present in the second phase.

6. The pumpable multiple phase composition of claim 4 where the structural stabilizer is selected from the group consisting of emulsifiers, viscosifiers, gelling agents, and mixtures thereof.

7. A pumpable multiple phase composition for carrying an agent comprising:
    a first phase;
    a second phase; and
    a third phase;
    where the first phase is suspended in the second phase to form a first pumpable emulsion, and the first pumpable emulsion is dispersed in the third phase to form the pumpable multiple phase composition, which is selected from the group consisting of an oil phase-in-aqueous phase-in-oil phase composition, and an aqueous phase-in-oil phase-in-aqueous phase composition;

where the agent is present in the first phase and is selected from the group consisting of a shale stabilizer, a filtration control additive, a viscosifier, a suspending agent, a dispersant, a thinner, an anti-balling additive, a lubricant, a wetting agent, a seepage control additive, a lost circulation additive, a drilling enhancer, a penetration rate enhancer, corrosion inhibitors, scavengers, catalysts, acids, bases, gelling agent, buffers, cross-linkers, and mixtures thereof;

where the third phase is selected from the group consisting of a drilling mud, a drill-in fluid, and a completion fluid, and where the pumpable multiple phase composition further comprises a weighting agent and a structural stabilizer.

* * * * *